(12) United States Patent
Haus et al.

(10) Patent No.: US 8,523,746 B2
(45) Date of Patent: Sep. 3, 2013

(54) MACHINE TOOL WITH A CHAIN MAGAZINE

(75) Inventors: Waldemar Haus, Winnenden (DE); Wolfgang Horn, Goppingen (DE)

(73) Assignee: MAG Europe GmbH, Göppingen (DE)

(*) Notice: Subject to any disclaimer, the term of this patent is extended or adjusted under 35 U.S.C. 154(b) by 688 days.

(21) Appl. No.: 12/822,535

(22) Filed: Jun. 24, 2010

(65) Prior Publication Data

US 2010/0331157 A1 Dec. 30, 2010

(30) Foreign Application Priority Data

Jun. 25, 2009 (DE) .......... 10 2009 030 387

(51) Int. Cl.
*B23Q 3/157* (2006.01)
(52) U.S. Cl.
USPC .............................. 483/56; 483/68; 211/1.56
(58) Field of Classification Search
USPC .......... 483/54–57, 66, 68; 211/1.56
See application file for complete search history.

(56) References Cited

U.S. PATENT DOCUMENTS

| | | | | |
|---|---|---|---|---|
| 3,073,024 A * | 1/1963 | Morris L et al. | ........... | 483/51 |
| 3,818,580 A * | 6/1974 | Pagella et al. | ............. | 483/7 |
| 4,110,897 A * | 9/1978 | Hipwell et al. | ............. | 483/10 |
| 5,215,513 A | 6/1993 | Maynard et al. | | |
| 5,944,643 A | 8/1999 | Koelblin et al. | | |
| 6,066,078 A * | 5/2000 | Koelblin et al. | ........... | 483/55 |
| 6,514,184 B2 * | 2/2003 | Oitaka et al. | .............. | 483/60 |
| 2005/0085359 A1* | 4/2005 | Stave et al. | ............... | 483/54 |
| 2006/0189464 A1 | 8/2006 | Corbean et al. | | |

FOREIGN PATENT DOCUMENTS

| | | |
|---|---|---|
| DE | 7113696 U | 9/1971 |
| DE | 4218656 A1 | 1/1993 |
| DE | 19503482 C2 | 12/1996 |
| DE | 202005021011 U1 | 4/2007 |
| EP | 1615745 A1 | 1/2006 |
| GB | 1263669 A | 2/1972 |
| JP | 62176723 A * | 8/1987 |
| WO | 00/02703 | 1/2000 |

* cited by examiner

*Primary Examiner* — Erica E Cadugan
*Assistant Examiner* — Jason L Vaughan
(74) *Attorney, Agent, or Firm* — Reising Ethington P.C.

(57) ABSTRACT

A machine tool with a chain magazine has a chain guide which extends in the x, y, and z-directions. It also has a magazine chain, which has chain members, which are connected to one another by means of universal joints and in each case have a tool receiver. The magazine chain is guided by means of the chain guide. The chain magazine is moveable in the z-direction for tool changing operations.

11 Claims, 7 Drawing Sheets

MACHINE TOOL WITH A CHAIN MAGAZINE

FIELD

The device relates to a machine tool with a chain magazine.

BACKGROUND

Chain magazines in machine tools have the object of receiving a large number of tools, which, as necessary, are fed to a tool spindle and are used there to machine a workpiece. Chain magazines of this type have a continuous, peripherally driveably mounted magazine chain, on which tool receivers are provided to hold a respective tool. Chain magazines of this type are known in various arrangements. It is known from EP 1 615 745 B1, to configure a chain magazine angularly with a substantially horizontal upper leg and a downwardly extending lower leg. The magazine chain itself is located in a vertical x-y-plane, the tools being held in the tool receivers configured as tool clamps in such a way that they extend in the z-direction.

It is known from DE 195 03 482 C2, to arrange the magazine chain only in an upper guide extending substantially horizontally, the holder of the tools being substantially of the same type as that described above. All the configurations have in common that an optimal utilisation of space is not possible in the arrangement of the chain magazines.

SUMMARY

Thus, it is the object of the present design to provide a machine tool with a chain magazine in such a way that the space can be optimally used. This object is achieved by a machine tool with a machine frame, and a workpiece holding device arranged on the machine frame. A tool spindle is arranged on the machine frame which is moveable at least in a horizontal x-direction and a vertical y-direction. A chain magazine having a chain guide which runs three-dimensionally has a magazine chain with chain members which are connected to one another by means of universal joints and has a tool receiver and is guided by the chain guide. The chain magazine is movable in a horizontal z-direction which is perpendicular to the x-direction and to the y-direction relative to the machine frame. The tool spindle, viewed in the horizontal z-direction, is moveable into an overlapping position with at least one tool receiver of the magazine chain.

The essence of the invention is to guide the magazine chain three-dimensionally in the space. This enables one and the same magazine chain to be allowed to run at will, depending on where space is available and how many tool receivers are optionally necessary for a specific machine tool. Depending on the required length of the magazine chain, it is arranged on the available space on the machine tool. Thus, the course may be horizontal and vertical and in every desired intermediate direction. All the arrangements and courses of the magazine chain can thus be combined with one another in one and the same magazine chain.

Further features, advantages and details of the invention emerge from the following description of an embodiment with the aid of the drawings.

DESCRIPTION OF THE PREFERRED EMBODIMENT

Figure 1:
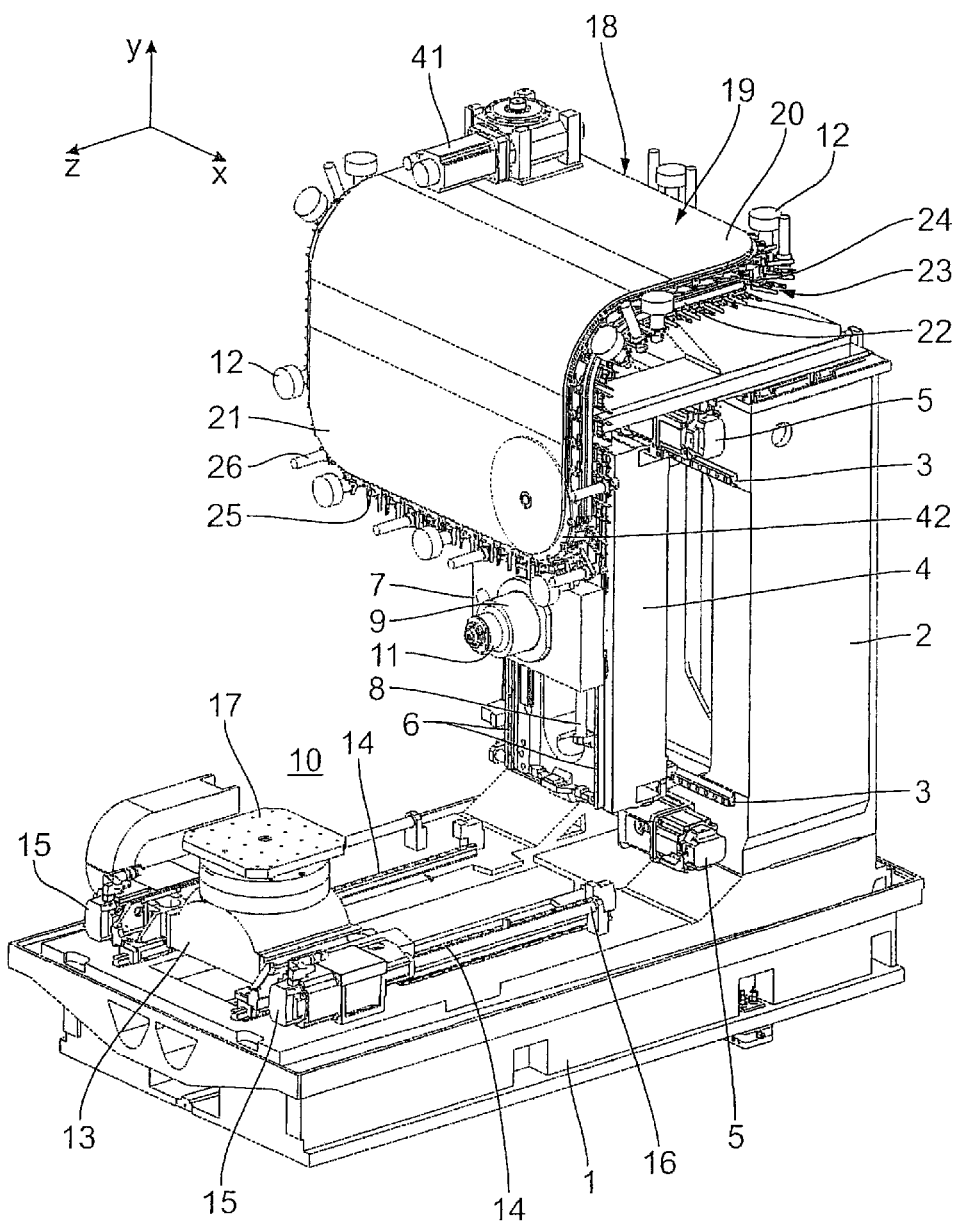
FIG. 1 shows a perspective view of a machine tool with a chain magazine according to the invention.

The machine tool shown in the drawings is a so-called stand machine, which has a horizontal machine bed 1 and a vertical stand 2 arranged thereon. The two form a machine frame. An x-slide 4 is displaceably arranged in the x-direction on the stand 2 on horizontal x-guide rails 3. The displacement drive takes place by means of x-drive motors 5.

A y-slide 7 is vertically displaceably arranged in the y-direction on the x-slide 4 on y-guide rails 6. The drive takes place by means of y-drive motors, not visible in the drawing, by means of y-spindle drives 8.

Arranged on the y-slide 7 is a tool spindle 9, which extends in the z-direction, with the z-direction running horizontally and being perpendicular to the x-y-plane spanned by the x-direction and the y-direction. The rotary drive of the tool spindle 9 takes place in the conventional manner by means of a spindle drive motor, not shown. The tool spindle 9, on its end facing a working space 10 located in front of the stand 2, in the conventional manner, has a chuck 11 to receive a tool 12.

A workpiece slide 13 is displaceably arranged in the z-direction on z-guide rails 14 in the working space 10 on the machine bed 1. The drive in the z-direction takes place by means of z-drive motors 15 by means of z-spindle drives 16. The workpiece slide 13 carries a workpiece rotary clamping table 17 for a workpiece to be machined.

A three-dimensional chain magazine 18 is arranged on the stand 2. It has a box-shaped support plate 19 which is used as a support device and has an upper, substantially horizontally extending plate portion 20 and a vertical plate portion 21 bent off from this downwardly. Attached to the outer peripheral edge of the support plate 19 as a chain guide is an essential chain guide rail 22, in which is arranged, continuously guided, the magazine chain 23 of the chain magazine 18. Attached to each chain member 24 of the magazine chain 23 is a fork-shaped tool clamp 25, a tool receiver, in which the shaft 26 of a tool 12 can be held in a clamping manner. The tool clamps 25 are open to the outside and extend away from the support plate 19, in other words also from the chain guide rail 22. On the lower side 27 of the plate portion 21, they thus extend vertically downwardly and are open toward the bottom.

Adjacent chain members 24 are in each case connected to one another by means of a universal joint 28, a so-called cardan joint. These consist, in the conventional manner of two joint forks 29, 30 rotated with respect to one another through 90° and two joint bolts 31, 32 which are connected to one another in the manner of a cross, in other words configured in one piece. Each chain member 24 has a chain member base body 33, to which the tool clamp 25 is attached and which is guided in the chain guide rail 22. The two joint forks 29, 30 are attached to two respective mutually adjacent chain members 24 and directed toward one another. Universal joints 28 of this type are basically generally known. The chain magazine 18 forms an independent assembly.

The configuration of the magazine chain 23 described allows the latter to be able to be three-dimensionally guided and to thus be able to run through paths curved in any manner in the three-dimensional x-y-z-space. It can therefore not only run through the curved portions 34, 35 substantially curved about a y-axis in the region of the plate portion 20, but also the curved portions 36, 37 substantially curved about a z-axis on the vertical plate portion 21 and finally also the curved portions 38, 39 substantially curved about an x-axis at the transition region from the plate portion 20 to the plate portion 21. Any desired combination of these curvatures is possible.

Provided on the support plate 19, specifically in the region of the curved portion 34, is a drive wheel 40 which engages in the magazine chain 23 and can be driven by a chain drive motor 41. The latter is attached to the support plate 19. A tensioning wheel 42 for the magazine chain 23 is provided on the diagonally opposite side in the region of the curved portion 37. Basically, it is possible to also drive this second wheel 42 by means of a chain drive motor corresponding to the motor 41, with the two motors then having to be synchronised with one another so the strand 43 of the magazine chain 23 facing the tool spindle 9 is precisely tensioned and, accordingly, it would be possible to precisely position the chain members 24 located there with tool clamps 25.

The support plate 19 of the chain magazine 18 is supported on supports 44, 45, which can be displaced on the upper side of the stand 2 on magazine guide rails 46 extending in the z-direction. The displacement takes place by means of a piston cylinder drive 47 associated with each support 44 or 45, and loaded with pressure medium, between two end positions. These two end positions are fixed by two respective switches 48, 49. This displacement of the chain magazine 18 horizontally in the z-direction is used for the purpose of carrying out a removal of a tool 12 from a tool clamp 25 and an insertion into the chuck 11 of the tool spindle 9 and the return of a tool 12 from the chuck 11 into a tool clamp 25, without an additional tool changer.

Figure 2:
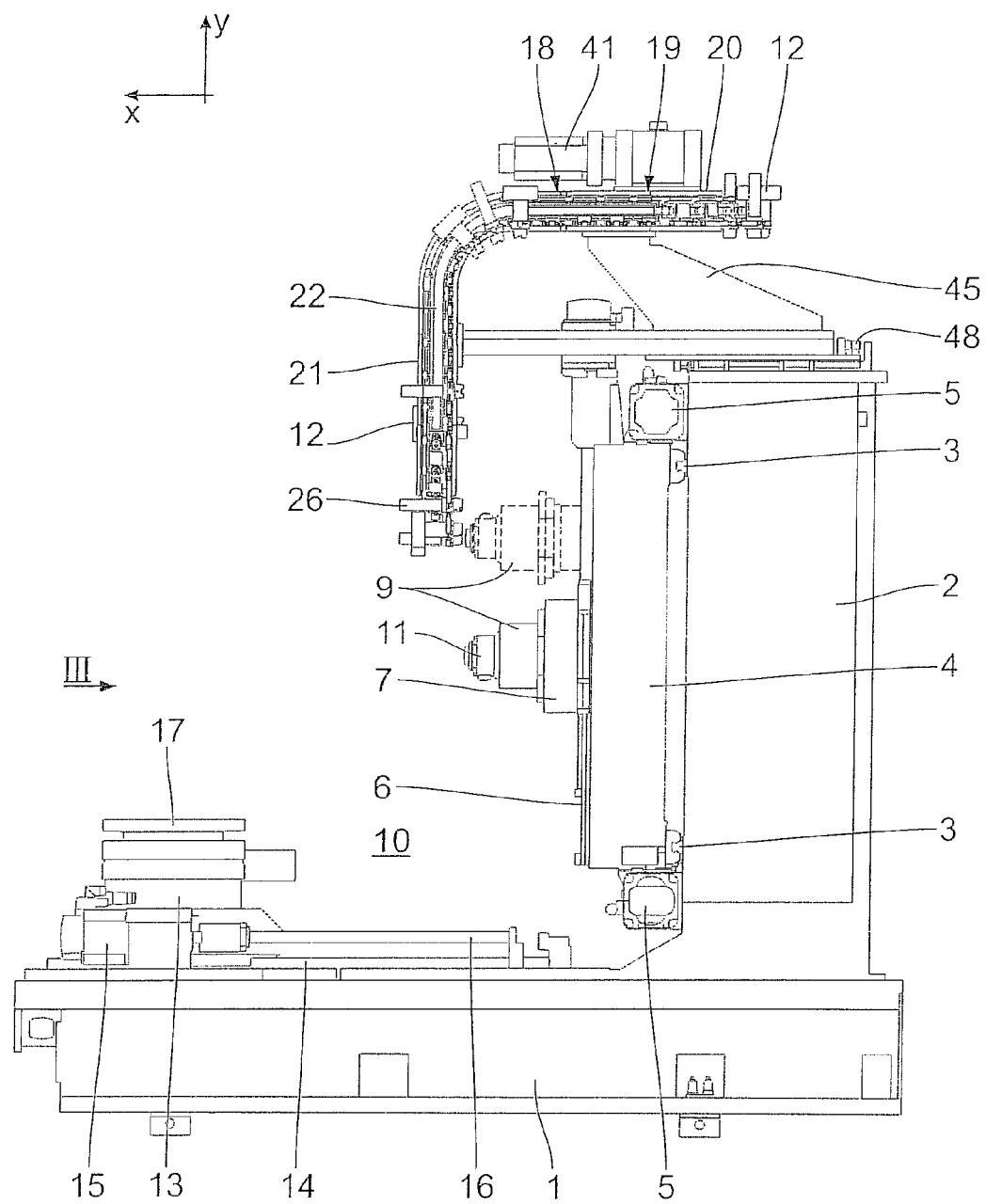
FIG. 2 shows a side view of the machine tool looking in the direction of the viewing arrow II in FIG. 3.
Figure 3:
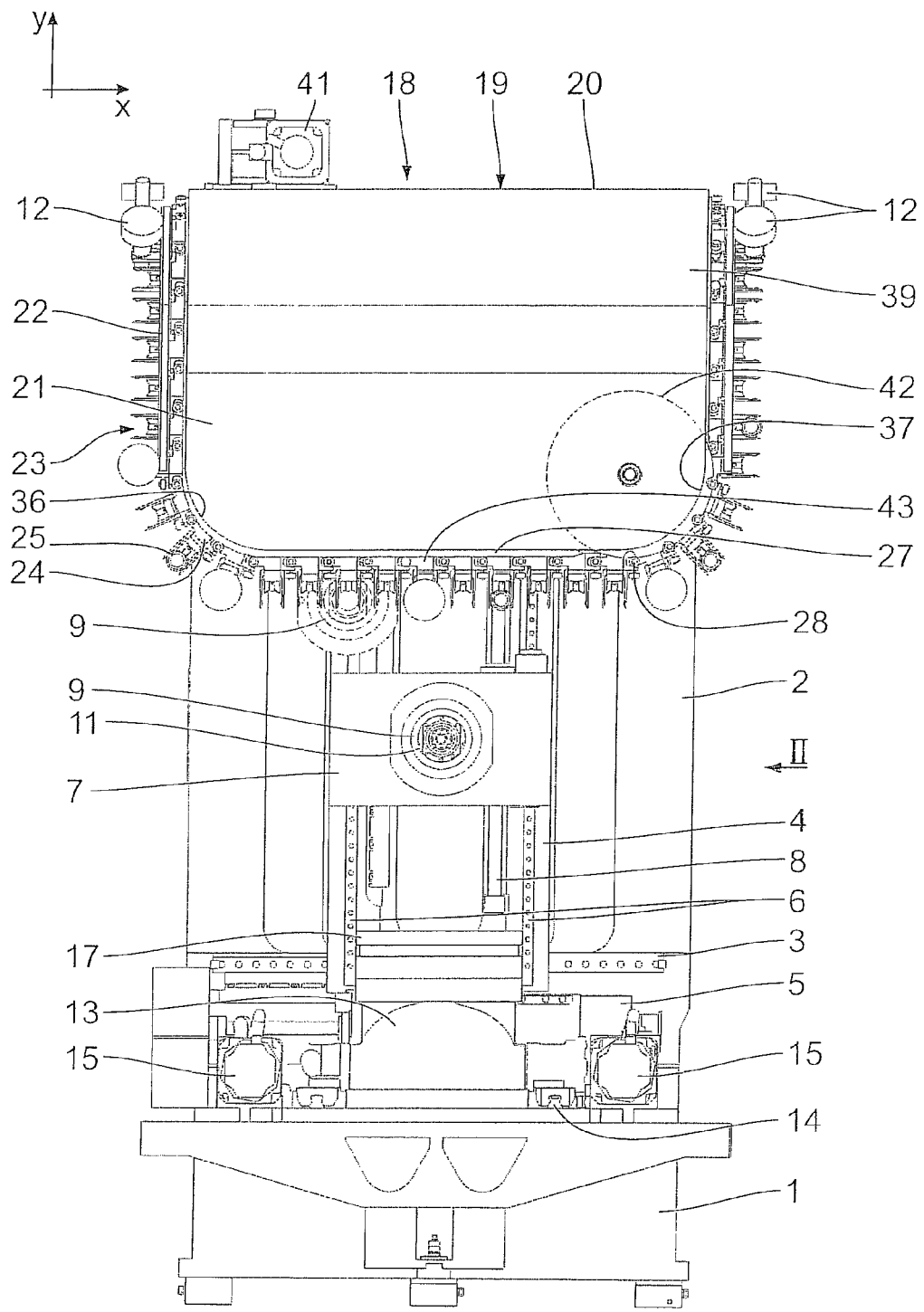
FIG. 3 shows a front view of the machine tool looking in the direction of the viewing arrow III in FIG. 2.
Figure 4:
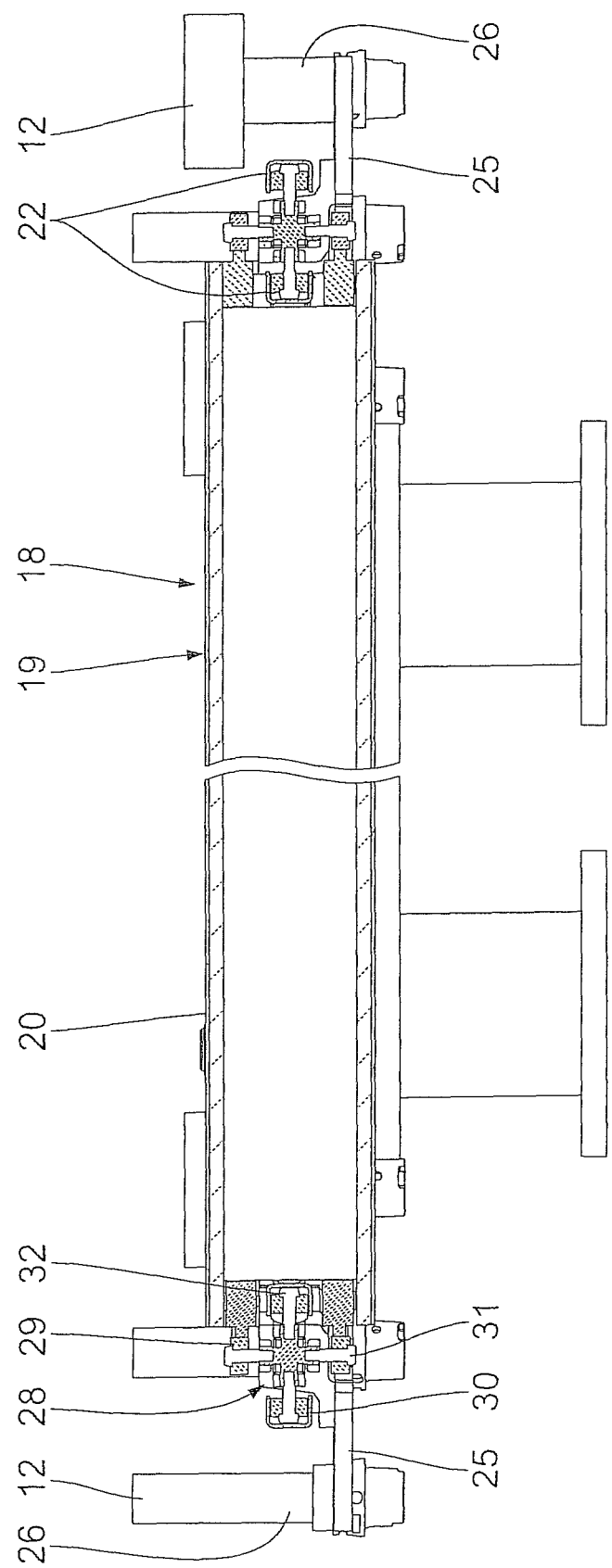
FIG. 4 shows a view partially in section through the chain magazine.
Figure 5:
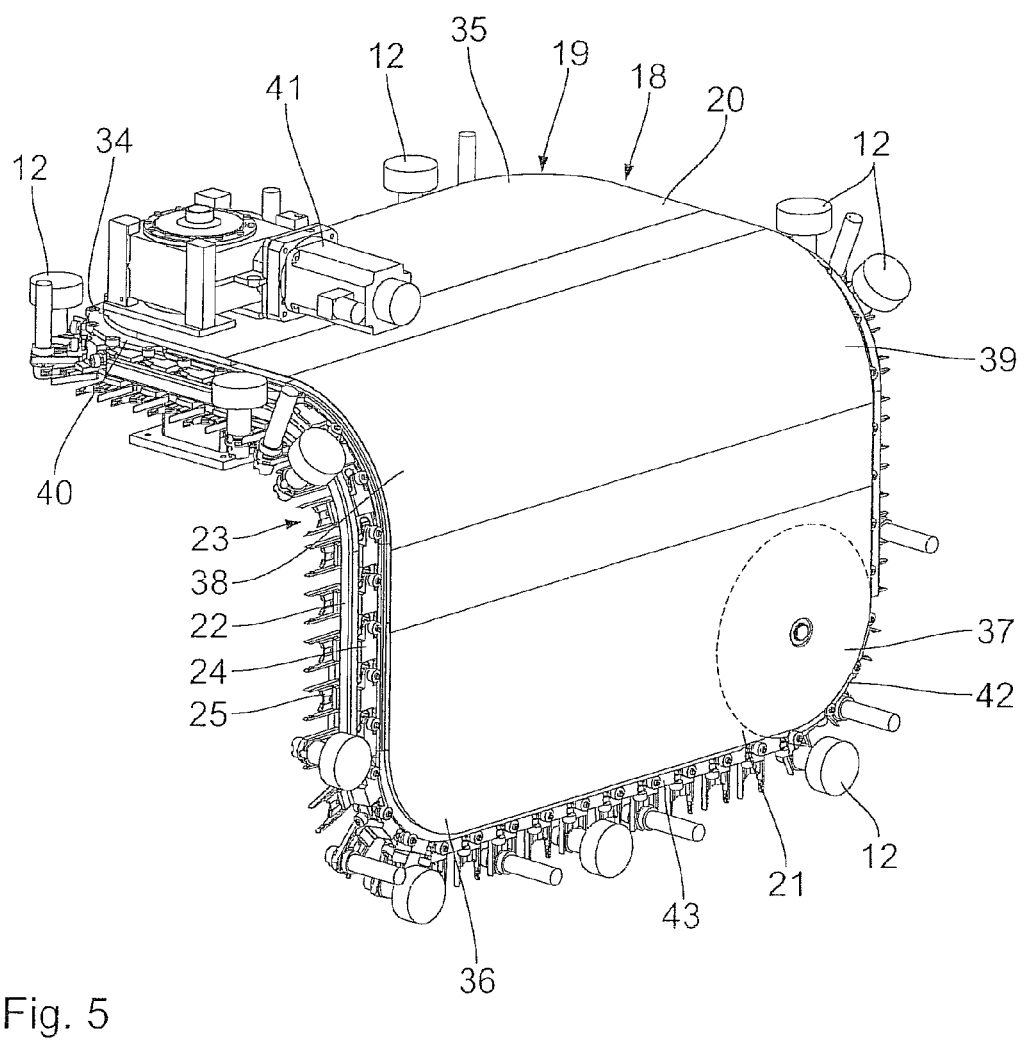
FIG. 5 shows a perspective view of the chain magazine.
Figure 6:
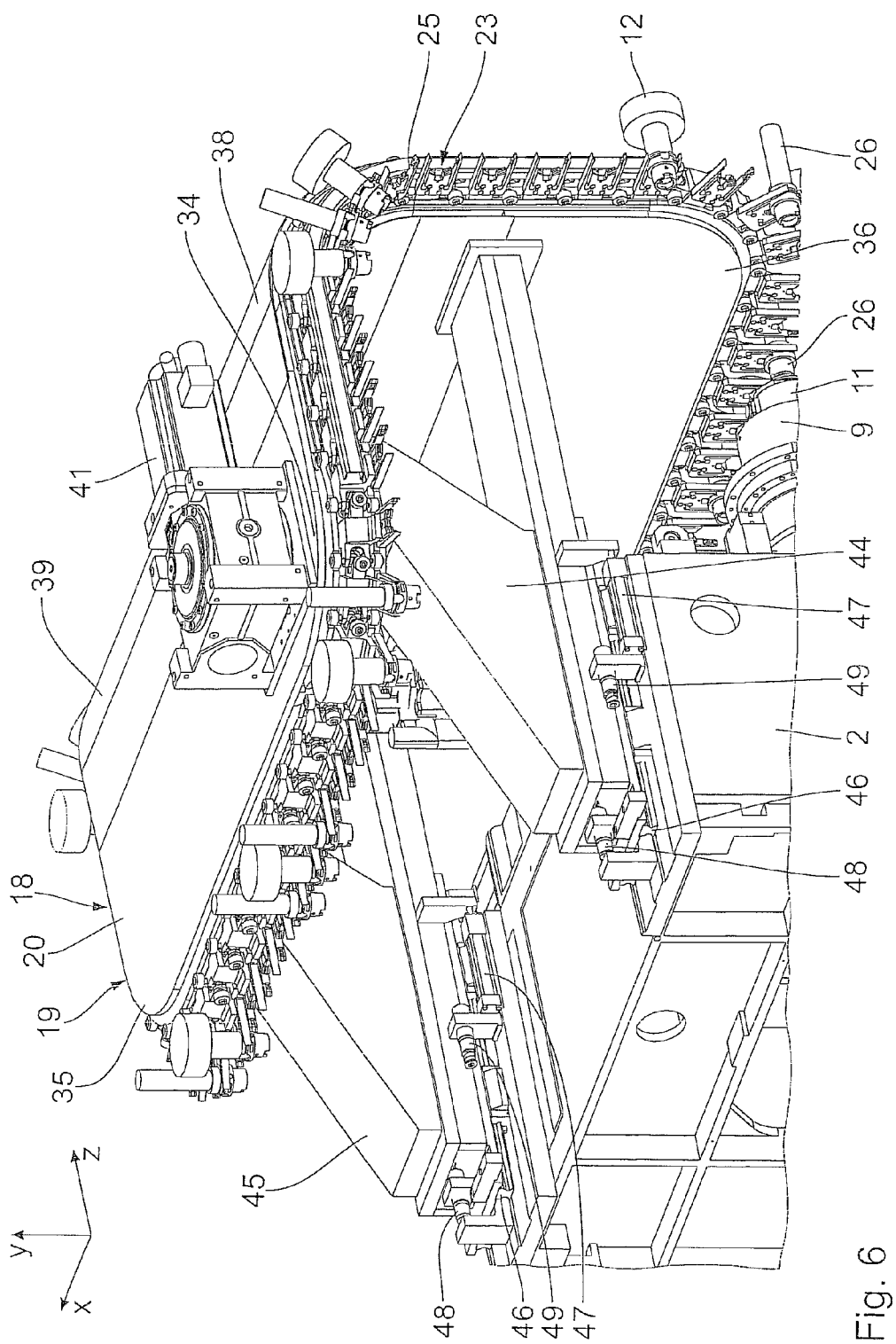
FIG. 6 shows a perspective view of the upper region of the machine tool with the chain magazine.
Figure 7:
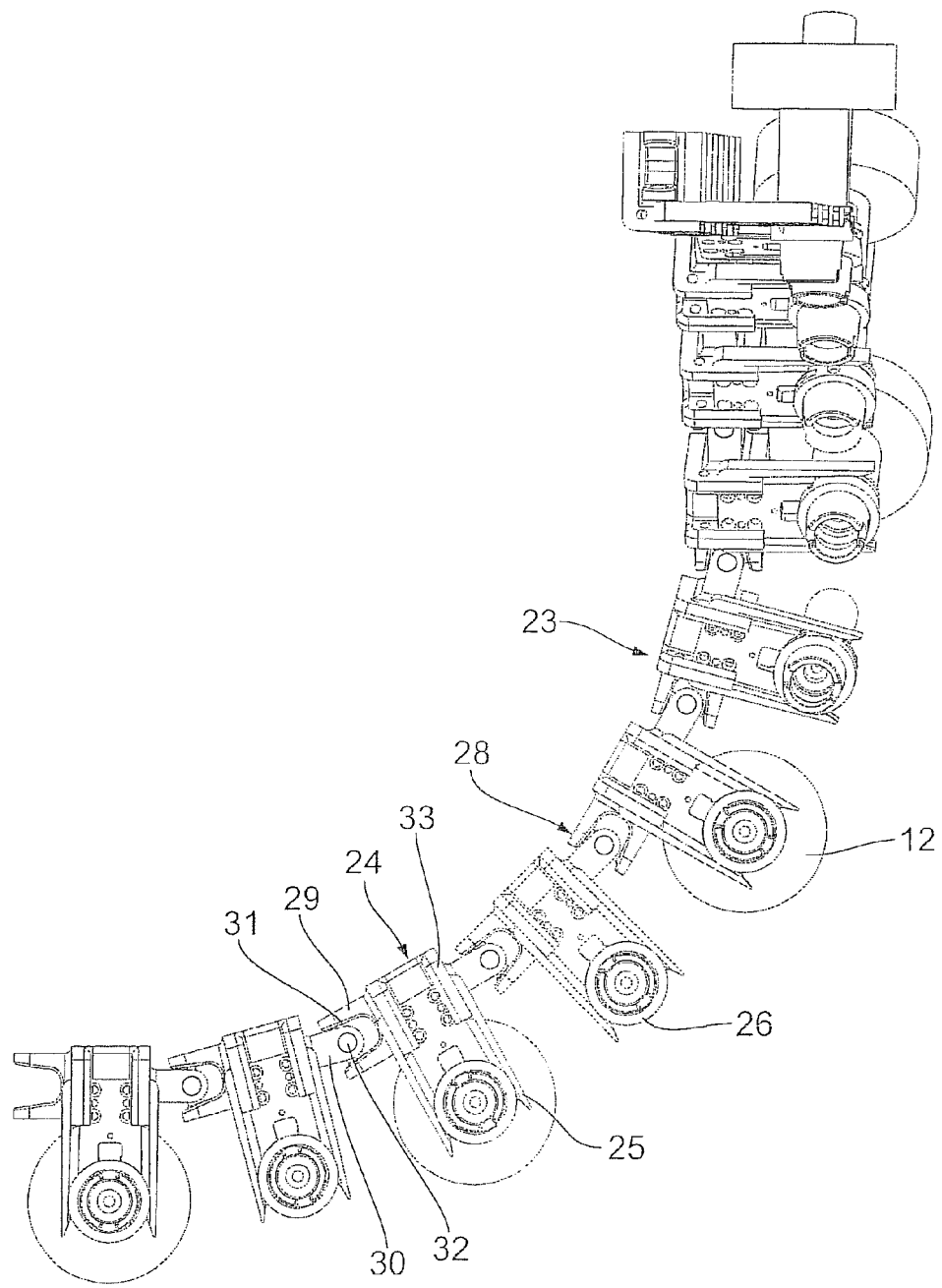
FIG. 7 shows a partial detail view of a magazine chain of the chain magazine.

If a tool 12 is to be removed from the chuck 11 of the tool spindle 9, the chain magazine 18 is located in its drawn-back position shown in FIG. 2, which is fixed by the rear end switch 48. The x-slide 4 and the y-slide 7 are moved in such a way that the shaft 26 of the tool 12 to be removed from the chuck 11 is loaded into a tool clamp 25 of the magazine chain 23 and is held there in a clamping manner. By moving the chain magazine 18 toward the front of the machine, the corresponding tool 12 is withdrawn from the opened chuck 11. This position of the chain magazine 18 is defined by the front end switch 49. The y-slide 7 is then moved downward, so the tool spindle 9 with its chuck 11 is freed from the magazine chain 23. If a new tool 12 is now to be inserted into the chuck 11, the chuck 11 is brought by correspondingly moving the x-slide 4 and the y-slide 7 behind the shaft 26 of the related tool 12 and the chain magazine 18 is then moved to the rear by correspondingly loading the piston cylinder drives 47, specifically into the rear position defined by the rear end switch 48. As a result, the shaft 26 of the new tool 12 is introduced into the chuck 11 and locked there. The y-slide 7 is then moved downward and the new tool 12 is withdrawn from the tool clamp 25.

What is claimed is:

1. A machine tool,
with a machine frame,
with a workpiece holding device arranged on the machine frame, and
with a tool spindle which is arranged on the machine frame, the tool spindle being moveable at least in a horizontal x-direction and a vertical y-direction,
with a chain magazine,
having a chain guide,
which extends in the x, y, and z-directions, and
having a magazine chain, which
has chain members, which
are connected to one another by means of universal joints and have at least one tool receiver, and
is guided by means of the chain guide,
wherein the chain magazine is movable in a horizontal z-direction, which is perpendicular to the x-direction and to the y-direction, relative to the machine frame, and,
wherein the tool spindle, viewed along the horizontal z-direction, is moveable into an overlapping position with at least one tool receiver of the magazine chain in order to enable direct tool exchange between the at least one tool receiver and the tool spindle.

2. A machine tool according to claim 1, wherein the chain magazine can be displaced between two end positions.

3. A machine tool according to claim 1, wherein the chain guide comprises at least one chain guide rail.

4. A machine tool according to claim 1, wherein the chain guide is provided on a support device.

5. A machine tool according to claim 4, wherein the support device comprises an upper horizontal section and a vertical section; and,
wherein the horizontal section and the vertical section have an outer peripheral edge on which the chain guide is arranged.

6. A machine tool according to claim 5, wherein the tool receivers are fork-shaped tool clamps, and wherein the tool clamps have an open side which faces downward when the tool clamps are positioned on the lower side of the vertical section of the support device.

7. The machine tool according to claim 6, wherein tools may be removed from a tool clamp and inserted into the tool spindle without the use of a separate tool changer.

8. A machine tool according to claim 1, wherein at least one chain drive device is provided.

9. A machine tool according to claim 8, wherein a support device is provided and wherein the at least one chain drive device is attached to the support device.

10. A machine tool according to claim 1, wherein a chain tensioning device is provided.

11. A machine tool according to claim 10, wherein a support device is provided and wherein the chain tensioning device is attached to the support device.

* * * * *